United States Patent
Braun

(10) Patent No.: US 9,482,004 B2
(45) Date of Patent: Nov. 1, 2016

(54) METHOD FOR PRODUCING A PANEL SANDWICH

(75) Inventor: Roger Braun, Willisau (CH)

(73) Assignee: Flooring Technologies Ltd., Pieta PTA (MT)

(*) Notice: Subject to any disclaimer, the term of this patent is extended or adjusted under 35 U.S.C. 154(b) by 74 days.

(21) Appl. No.: 14/129,567

(22) PCT Filed: Jun. 20, 2012

(86) PCT No.: PCT/EP2012/061845
§ 371 (c)(1),
(2), (4) Date: Mar. 7, 2014

(87) PCT Pub. No.: WO2013/000791
PCT Pub. Date: Jan. 3, 2013

(65) Prior Publication Data
US 2014/0311086 A1    Oct. 23, 2014

(30) Foreign Application Priority Data

Jun. 28, 2011  (EP) .................................. 11171652

(51) Int. Cl.
| | |
|---|---|
| E04C 2/296 | (2006.01) |
| B32B 37/04 | (2006.01) |
| B32B 5/18 | (2006.01) |
| B32B 21/00 | (2006.01) |
| E04F 13/08 | (2006.01) |
| E04F 15/10 | (2006.01) |

(Continued)

(52) U.S. Cl.
CPC ............ *E04C 2/296* (2013.01); *B32B 5/18* (2013.01); *B32B 21/00* (2013.01); *B32B 37/04* (2013.01);

(Continued)

(58) Field of Classification Search
CPC ......... B32B 21/00; B32B 5/18; B32B 37/04; B32B 2037/1215; E04C 2/246; E04C 2/296; E04F 13/00; E04F 13/0866; E04F 15/107
See application file for complete search history.

(56) References Cited

U.S. PATENT DOCUMENTS

| 4,587,164 A | 5/1986 | Freeman |
| 8,196,366 B2 | 6/2012 | Thiers et al. |

(Continued)

FOREIGN PATENT DOCUMENTS

| CN | 1874913 | 10/2004 |
| CN | 000101112807 | 8/2007 |

(Continued)

OTHER PUBLICATIONS

Chinese Office action for Patent Application No. 201280032606.2.
(Continued)

*Primary Examiner* — Philip Tucker
*Assistant Examiner* — Jimmy Smith, Jr.
(74) *Attorney, Agent, or Firm* — Bachman & LaPointe, PC

(57) ABSTRACT

A method for producing a panel sandwich (2, 17, 40) for use as a wall, ceiling or floor panel (1, 16) comprising at least the following steps: providing a base panel (7, 20, 31) made of wood-based material, arranging a sound-insulating layer (9, 18) above the base panel (7, 20, 31), arranging a cover panel (11, 22, 38) above the base panel (7, 20, 31), pressing the sandwich, wherein an elastic plastic material is used to produce the sound-insulating layer (9, 18), wherein according to a first alternative of the invention, a closed-cell foam (9a) is arranged as the elastic plastic material, wherein the plastic material before being introduced into the sandwich panel has an elasticity modulus under pressure of 0.25 MPa to 1.5 MPa, according to a second alternative of the invention, the elastic plastic material applied is a self-adhesive plastic material (18c) which connects the base panel (20) to the cover panel (22), is elastic when set, has an elasticity modulus under pressure of 0.25 MPa to 1.5 MPa and has a minimum thickness of 0.3 mm.

13 Claims, 4 Drawing Sheets

(51) Int. Cl.
  *E04C 2/24* (2006.01)
  *B32B 37/12* (2006.01)
(52) U.S. Cl.
  CPC ........... *E04C 2/246* (2013.01); *E04F 13/0866* (2013.01); *E04F 15/107* (2013.01); *B32B 2037/1215* (2013.01); *B32B 2419/00* (2013.01); *B32B 2607/00* (2013.01); *E04F 2290/042* (2013.01); *E04F 2290/043* (2013.01); *Y10T 29/49616* (2015.01)

(56) References Cited

U.S. PATENT DOCUMENTS

| | | | |
|---|---|---|---|
| 2004/0134587 A1* | 7/2004 | Broberg | B32B 27/08 156/60 |
| 2004/0140151 A1 | 7/2004 | Gallant | |
| 2005/0126848 A1 | 6/2005 | Siavoshai et al. | |
| 2007/0178794 A1* | 8/2007 | Nishio | B32B 27/12 442/394 |
| 2007/0218270 A1* | 9/2007 | Huntress | B29C 44/326 428/304.4 |
| 2009/0183457 A1 | 7/2009 | Boucke | |

FOREIGN PATENT DOCUMENTS

| | | |
|---|---|---|
| DE | 20108358 | 9/2001 |
| JP | 63007901 | 1/1988 |
| JP | 2002030793 | 1/2002 |

OTHER PUBLICATIONS

International Search report dated Jul. 25, 2012.

* cited by examiner

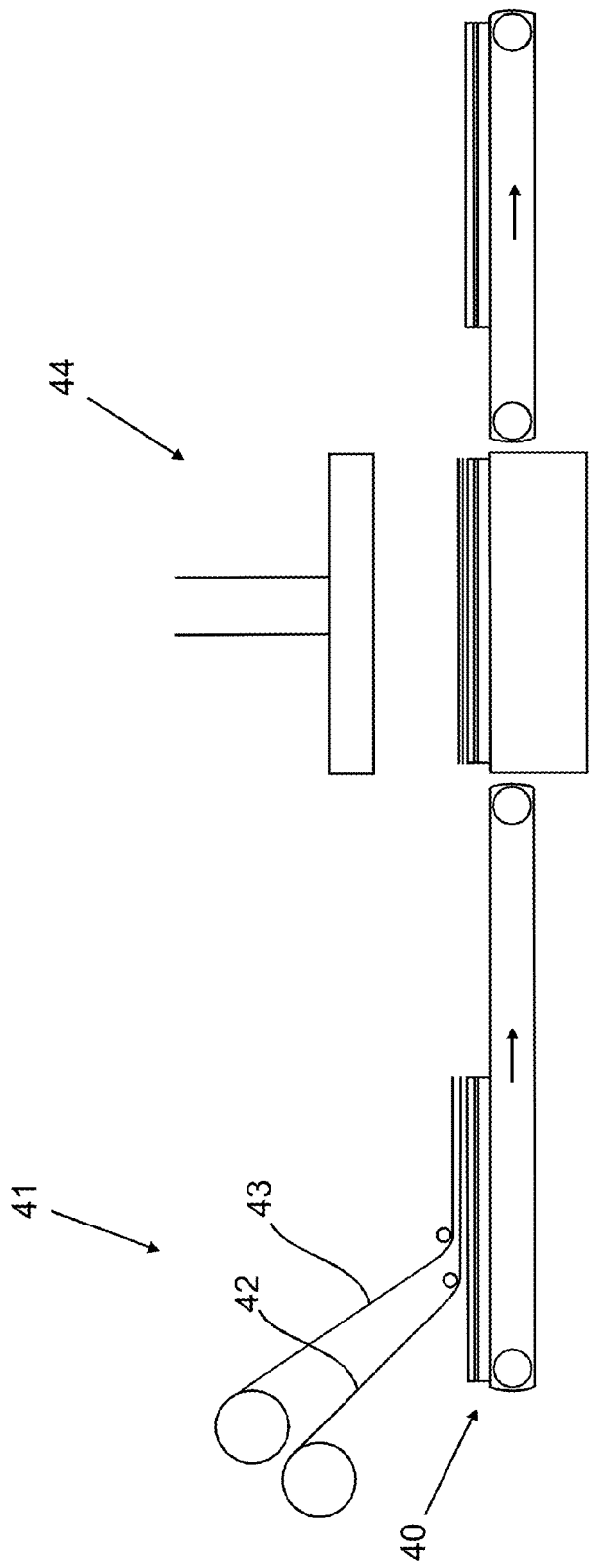

METHOD FOR PRODUCING A PANEL SANDWICH

BACKGROUND OF THE INVENTION

The invention relates to a method for producing a panel sandwich for use as a wall, ceiling or floor panel, having at least the following steps: providing a base panel made of wood-based material, arranging a sound-insulating layer above the base panel, arranging a cover panel above the base panel, and pressing the sandwich. The invention further relates to a panel sandwich.

A generic panel sandwich is known for example from WO 03/016655 A1. This document discloses a floor panel consisting of a base panel with a sound-insulating layer above the base panel, and a cover panel above the sound-insulating layer. A cork layer or a polyurethane foam can be used as the sound-insulating layer.

A disadvantage is that cork is a very expensive material and is unsuitable for industrial mass production, especially given the ever-increasing popularity and related decreasing sales price of such floor panels. Polyurethane foam in contrast is economical; however, it is not elastic over the long-term in comparison to the calculated life of panels of approximately 10-15 years, and therefore loses its sound-insulating properties relatively quickly.

SUMMARY OF THE INVENTION

The object of the invention is therefore to provide a method for producing a panel sandwich that has a particularly long-lasting sound-insulating layer and is particularly economical. In addition, the object of the invention is to provide panel sandwiches that are particularly economical and can be integrated particularly easily into conventional production processes of panel sandwiches and panels.

The object is achieved by a method as well as a panel sandwich as disclosed herein. Advantageous developments of the invention are also specified.

The method according to the invention for producing a panel sandwich for use as a wall, ceiling or floor panel comprises at least the following steps:

providing a base panel made of wood-based material,
arranging a sound-insulating layer above the base panel,
arranging a cover panel above the base panel,
pressing the sandwich, preferably in a press,
characterized in that an elastic plastic material is used to produce the sound-insulating layer, wherein a closed-cell foam is arranged as a sound-insulating layer according to a first alternative of the invention. Another alternative is explained as follows.

The closed-cell foam used according to the first alternative is understood to be a foam that consists of a (polymer) matrix material in which cells (hereinafter termed pores) are formed, wherein the majority of the cells of the foam form a non-communicating system. Gas cannot be exchanged along a direct path between the cells. Between the individual cells, only a slight amount of media enclosed in the cells can be slowly exchanged such as gases (e.g. air) and/or moisture for example by diffusion e.g. through the cell wall.

A closed-cell foam therefore for example at least largely prevents the absorption of moisture by the foam from the surroundings, or the escape of media from the foam into the surroundings. To be understood as medium/media are all gaseous and/or liquid substances or mixtures of substances.

Open-cell foams in contrast primarily consist of a matrix material with cells that communicate with each other, i.e., their cell walls are penetrated or do not exist. Open-cell foams are in particular distinguished from closed-cell foams in that with open-cell foams, at least a majority of the cells possess at least two communicating channels with neighboring cells that e.g. are formed by penetrations in the cell walls.

The invention also comprises combined foams, i.e. foams that both have open-cell regions as well as closed-cell regions. This also includes integral foams with a pore density (i.e., the number of pores per surface and/or volume) that increases in the Z-direction from the surface toward the middle of the foam.

The inventors have found that closed-cell foams are particularly elastic and, after undergoing stress, have a high resiliency which offers a particularly effective damping, sound-insulating layer in conjunction with a sandwich panel.

It is particularly preferable to use closed-cell foams that, before being introduced into the sandwich panel, have an elasticity modulus under pressure of 0.25 MPa to 1.5 MPa, particularly preferably 0.35 MPa to 1.25 MPa and advantageously 0.5 MPa to 1.0 MPa: The elasticity modulus under pressure can be advantageously increased by compression.

Furthermore, it is particularly preferable to use closed-cell foams having a bulk density between 75 kg/m$^3$ to 350 kg/m$^3$, preferably between 85 kg/m$^3$ to 325 kg/m$^3$ and advantageously between 100 kg/m$^3$ to 300 kg/m$^3$.

Another advantage of closed-cell foams is that they remain elastic for a particularly long time and hence retain their elasticity over the entire life of a panel. In addition, they are insensitive to typical external effects that a panel undergoes in use or production. During production, this includes for example high pressures and/or high temperatures, or during use, fluctuating humidity, mechanical stress, moisture, extreme fluctuations in heat from e.g. floor heating or exposure to sun.

The closed-cell foam therefore advantageously enables a particularly lasting resilient effect of the cover panel which results in a particularly sound-insulating effect over the entire life of a panel sandwich and beyond.

According to a second alternative of the invention, the sound-insulating layer consisting of an elastic plastic material is applied as a self-adhesive plastic material that connects the base panel to the cover panel and is elastic in a set state, wherein the set sound-insulating layer of self-adhesive plastic material has a minimum thickness of 0.3 mm.

The use of adhesives for bonding panels is generally known. The function of the adhesive is exclusively to bond two objects such as two panels. Adhesives are used that have established a non-elastic bond between two objects after fully hardening. Adhesives are applied as thin as possible to enable particularly secure bonding of the panels and also to use as little of the expensive adhesive as possible. In a hardened state, the thickness of the layer of such adhesives is normally approximately 0.01 mm to 0.1 mm.

The application of a sound-insulating layer of self-adhesive plastic material means creating a layer that, in a set state, has a resilient, i.e., elastic effect and therefore returns to its original position after the load dissipates. Such a layer is unknown in conjunction with sandwich panels for panels, and is also not obvious.

The self-adhesive plastic material which is used according to the invention is accordingly related to adhesives since it possesses a self-adhesive property and is also suitable for bonding two objects to each other. The particular property of the self-adhesive plastic material as a sound-insulating layer requires that the completely set, or hardened, or fully-reacted self-adhesive plastic material remains elastic after setting. Furthermore, the sound-insulating effect only occurs at a minimum thickness of the set sound-insulating layer of 0.3 mm. Adhesives are not used at this thickness, particularly not for bonding wood-based material panels, or base panels with cover panels. Consequently, only the combination of a self-adhesive plastic material that is elastic after setting with the minimum thickness of the sound-insulating layer being 0.3 mm in a set state achieves the desired sound-damping effect.

A sufficient elasticity of the self-adhesive plastic material according to the invention exists when the set self-adhesive plastic material has an elasticity modulus under pressure of 0.25 MPa to 1.5 MPa, particularly preferably 0.35 MPa to 1.25 MPa, and advantageously 0.5 MPa to 1.0 MPa.

It is particularly easy and advantageous to integrate the application of the self-adhesive plastic material into conventional production methods for a panel sandwich or a panel, and the sequence of the individual process steps only has to be slightly adapted. The production costs are thereby significantly reduced in comparison to known methods for producing sandwich panels and/or panels so that the overall increased costs of adhesives are insignificant.

The self-adhesive plastic material as well as the layer of closed-cell foam can be applied in several plys. A first ply of a self-adhesive plastic material (hereinafter also termed adhesive) can be initially cross-linked before applying a second or additional ply (partially gelled) in order to prevent the self-adhesive plastic material from running.

A panel sandwich is composed of layers of the same or different material arranged on each other and bonded to each other. In addition to the described sound-insulating layer, the additional layers of the panel sandwich according to the invention consist of different materials such as wood, wood-based materials, plastic, metal, polymer or composite material that for example consist of wood fibers and plastic. Sandwich panels are also known in which the individual layers completely or at least partially consist of the same raw material. For example, wood-based materials with different layers composed of for example particle board and fiberboard are also counted as panel sandwiches. In contrast, the classic wood-based materials such as plywood, veneered wood panels, multilayer chip board, multilayer OSB panels or fiberboard with varying densities over the thickness of the panel are not considered sandwich panels because the individual layers are made of the same components (chips, fibers, veneers, OSB strands) that in certain circumstances have different dimensions (coarse, fine, thick, thin).

A panel sandwich is characterized in that it at least partially consists of prefabricated layers that are bonded to each other. Adhesive for example can be used for this bonding; alternately, self-adhesive materials are used.

The cover panel of the panel sandwich according to the invention can be produced from any panel-shaped material. Cover panels are for example conceivable that consist of plastic (such as PVC), metal, metal foil or composite materials such as wood/plastic composites (WPC). It is particularly preferable for the cover panel to consist of a wood-based material such as a chipboard, OSB panel, plywood (such as a veneer wood panel) or solid wood panel such as a three-layer panel. A cover panel consisting of a fiberboard is particularly preferable, however. From the group of fiberboards, e.g. light MDF panels (bulk density<700 kg/m$^3$) or MDF panels (bulk density=700 kg/m$^3$ to 800 kg/m$^3$) can be used as the cover panels, particularly advantageously however high-density cover panels made of HDF (bulk density>800 kg/m$^3$).

Whereas the cover panel can be considered the support panel for a surface coating, the base panel can be considered the support panel of the sandwich. The base panel consists of a wood-based material. Wood-based materials associated with the base panel can in particular be broadly interpreted. That is, in addition to the classic wood-based materials such as chipboard, OSB panels, fiberglass, solid wood panels or fiberboard, they can be understood as composite panels with wood components such as WPC panels, or paper-based WPC panels in conjunction with the base panel. Lightweight panels consisting of for example a wood-based material in combination with paper and/or non-elastic plastic foams are also counted as wood-based material for base panels within the context of the invention.

To be understood as "providing a base panel" can be all necessary or advantageous measures to facilitate the particularly easy arrangement, production and further processing of the sound-insulating layer. In addition to the actual production of the base panel, provision can accordingly also comprise for example the following additional measures, individually or in combination: The treatment of the base panel by grinding, priming, coating with a liquid or solid coating substrate, or an adhesive and/or local reinforcement of the base panel, for example by means of a liquid reinforcement.

The arrangement of the cover panel is also to be understood broadly and comprehensively in conjunction with the invention. The arrangement of a cover panel can also comprise additional measures. These can be the same measures listed for the base panel and/or the coating (such as painting or lamination), cutting to size, levelling, structuring and/or additional measures. The list of measures is not to be understood as restrictive in regard to the base panel or the cover panel.

When considering the overall structure of a panel sandwich, the bottom side of the panel sandwich is the side that faces a surface delimiting a room such as a wall, ceiling or floor. To be understood as the top side of the sandwich is the side of the panel sandwich opposing the bottom side and hence, in a state of use, facing the room. The same holds true for the bottom sides and top sides of the relevant layers of the panel sandwich.

The bottom side as well as the top side of the panel sandwich/a layer do not have to directly neighbor a room-delimiting surface/a room. They can be covered by additional layers that prevent direct neighboring of a room-delimiting surface/room.

The expression "above" accordingly always refers to the alignment of the panel sandwich/the individual plys in a position of use in which the bottom side(s) are facing a room-delimiting surface and the top side(s) are facing a room.

A second layer arranged "above" a first layer therefore does not have to directly neighbor the first layer; it is, however, arranged above the first layer proceeding from the bottom side; i.e., in addition, a second layer that is aligned relative to a first layer can be spatially separated from the first layer by means of additional layers.

The surface of the panel sandwich or the individual layers of the panel sandwich can be understood to be the bottom side, top side, as well as the edges of the panel sandwich/individual layers.

The sandwich is advantageously pressed in a press. For example, a short cycle press or a continuous press can be used. If applicable, it is also possible to achieve the pressing of the sandwich with rollers if pressure that is only applied briefly is sufficient to produce the panel sandwich. It is also possible to achieve the pressing of the layers of the panel sandwich by stacking and, if applicable, applying pressure with weights, or by placing the stack of panels under tension. The setting and pressing of the panel sandwich is thereby supported by the intrinsic weight of the respective panel.

When a self-adhesive plastic material is used as a sound-insulating layer, it bonds the base panel to the cover panel. This bond can be understood both as a mechanical or chemical bond between adhesive and cover panel, or between adhesive and base panel. The bond is characterized in that it is impossible to undo the bond without destruction under the conditions of use of the panel sandwich.

The set condition of the self-adhesive plastic material is achieved when for example the molecules of the plastic material are cross-linked, or the self-adhesive plastic material has hardened. "Hardening" in this sense is however not to be understood as solidification, i.e., the loss of elasticity of the self-adhesive plastic material. The self-adhesive plastic material always remains elastic and has the above-mentioned elasticity modulus values under pressure.

According to a development of the invention, the closed-cell foam is applied in the form of a strip according to the first alternative of the invention. The closed-cell foam is therefore completely or at least however partially in a completely set state.

To be understood as the form of a strip is a shape of the foam in which the thickness of the foam is significantly less than the width and/or length of the foam. In this context, a strip is also to be understood as a foam that for example is panel-shaped or as a mat.

The foam can for example be rolled up, and is unrolled from the roll and arranged on the base panel during the production process. The strip foam can for example be laid down, rolled on, pushed and/or pressed on.

An adhesive layer is preferably arranged between the closed-cell foam and the surface of the base panel. The adhesive layer is therefore arranged below the foam and above the base panel, and can accordingly be arranged either on the surface of the base panel and/or on the surface of the side of the foam facing the base panel.

It is particularly preferable for an adhesive layer to be arranged both above and/or below the foam. As described with reference to the adhesive layer arranged below the foam, the adhesive layer arranged above the foam can be arranged on the surface of the foam and/or on the surface of the bottom side of the cover panel. The adhesive layer is generally between 0.05 mm to 0.1 mm thick. It does not manifest a sound-insulating effect.

It is particularly preferable to design the adhesive layer below and/or above the foam as a 1-component polyurethane adhesive, 2-component polyurethane adhesive, PVAC adhesive or as an ethylene acetate copolymer.

The adhesive layer can for example be applied as a liquid or paste.

It is for example sprayed on, poured on, squeegeed, painted or rolled on. It is also possible to arrange the adhesive layer as a solid adhesive layer that for example is also a roll, panel, net or mat. Even in a solid form, it can be placed onto and/or pressed onto the foam and/or onto the base panel/cover panel with conventional application devices such as rollers. It is also possible to use for example a rolled up foam with adhesive layer(s) already applied on the foam on one or both surfaces of the foam.

The adhesive of the adhesive layer can be designed such that it is only activated when the panel sandwich is pressed in the press, and the individual layers (such as the base panel, sound-insulating layer and cover panel) are adhered to each other. In addition, for example when using a 2-component adhesive, a first component of the adhesive can be applied to the base panel and/or the cover panel, whereas a second component is arranged on the surface of the foam. It is also possible for the foam to act as one component of a 2-component adhesive.

According to one development of the invention, the closed-cell foam consists of a polyolefin, or a mixture of polyolefins. It is also possible for the main component of the closed-cell foam to be a polyolefin or a mixture of polyolefins. The use of polyolefins foams in wood-based materials, sandwich panels or panels is previously unknown. In particular, the outstanding sound-insulating effect of a polyolefin foam in conjunction with a sandwich panel, the particular longevity of a polyolefin foam and the particularly advantageous lasting effect as a sound insulator even after many years of stress on a sandwich panel/a panel are surprising to a person skilled in the art.

However, foams that can be used as the closed-cell foam are for example also foams based on polystyrene, polypropylene (PP) and polyvinyl chloride (PVC).

Closed-cell foams made of polyolefins can the difficult to process, especially to adhere. The danger exists that when the foam does not permanently or completely adhere to the base panel and/or the cover panel, delamination effects can arise in the sandwich. It is therefore particularly preferable for the closed-cell foam to be corona-treated. The entire surface of corona-treated foams can be adhered in a particularly easy and reliable manner so that in particular, the processing time is also particularly short.

In addition to a liquid application of the self-adhesive plastic material according to the second alternative of the invention by, for example, rolling, spraying, painting, squeegeeing or pouring, it is also particularly preferable to apply the self-adhesive plastic material in a solid or pasty form. The self-adhesive plastic material can accordingly be arranged e.g. in the form of films, pastes, or highly viscous layers (pasty). It is possible in this case as well to arrange a plurality of e.g. particularly thin layers of the self-adhesive plastic material on each other in order to achieve the minimum thickness of 0.3 mm in a set state.

Any self-adhesive plastic material that is elastic in a set state that is suitable for bonding panels can be used as the self-adhesive plastic material. For example, it is possible to use EVA, EVA copolymers, or styrene rubber copolymers, or a plastic material based on polyester elastomers, polyurethane elastomers, or co-polyamide elastomers as the self-adhesive plastic material. It is particularly preferable to use a thermoplastic reactive polyurethane material or an elastic hot melt adhesive in a set state.

According to a particularly preferred embodiment of the second alternative of the method according to the invention, the self-adhesive plastic material is made from expandable material that is designed to expand when pressed, hardens after expanding, and is elastic after hardening. The expanding material can bond the base panel and cover panel to each other in a self-adhesive manner so that additional adhesive layers can be dispensed with.

The expansion of the material can be triggered or occur in various ways. The trigger can for example be a catalyst, and/or pressure, and/or elevated temperature, and/or radiation.

Any material that can increase its volume by a chemical, or thermal, or other reaction can be understood as an expanding material. A material is preferably used that forms a foam after expansion, especially a closed-cell foam. Here, in a particularly advantageous manner, expanding materials can be used that consist of polyolefins or at least contain them.

It is particularly preferable to use a material whose expansion process, especially the time of expansion, the expansion intensity, and/or the duration of expansion, and/or the properties of the expanded material such as the pore size, pore distribution, and/or the layer thickness can be controlled, for example by adjusting the temperature, pressure, and/or by adding additives/catalysts that influence the processing characteristics (such as hardeners).

The material suitable for expanding can be arranged in any form above the base panel. It can for example be designed as a liquid, gel, solid layer, or also as a layer of expanding particles. It is particularly preferable to apply the sound-insulating layer when viscous, i.e., highly viscous or pasty. Undesirable running or flowing before pressing the material used by the manufacturer of the sound-insulating layer can thereby be prevented in a particularly advantageous manner. In addition, this particular embodiment allows a particularly large amount of material to be applied which makes it possible to create e.g. particularly thick sound-insulating layers.

The expansion of the material can be triggered or controlled in various ways. It is conceivable to use a material that for example reacts to pressure, and/or heat, and/or radiation. 2-component materials, for example, are also conceivable. It could, for example, be possible to apply a first component on the base panel and a second additional component of the expanding material on the cover panel. After the cover panel is arranged above the base panel, both components can react with each other, expand and harden.

It is also possible to use additives/catalysts that for example trigger, delay or influence the expansion in another manner. In a particularly advantageous manner, it is thereby possible to prevent the self-adhesive plastic material from prematurely expanding, or to trigger a precisely-timed expansion.

The "hardening" of the expanding material is understood to be curing, reacting or cross-linking during or after the expansion of the material, wherein the material is elastic according to the invention in the expanded and/or hardened state. Expanded material is in particular to be considered elastic when it has the aforementioned elasticity modulus under pressure relevant to the foam layer or the layer of self-adhesive plastic material.

In particular, polyurethane or Expancel is considered an expanding material.

It is particularly preferable to apply the sound-insulating layer on a top side of the base panel and/or a bottom side of the cover panel. In each version of the embodiment, the sound-insulating layer is therefore arranged above the base panel. In addition, the production process is particularly flexible. For example, depending on the available production devices, the sound-insulating layer can be arranged on the base panel, but it can also be arranged on the bottom side of the cover panel and only be incorporated in the production process when the cover panel is applied. The sound-insulating layer can also be applied both on the top side of the base panel and on the bottom side of the cover panel, for example as a sound-insulating layer that consists of two plys.

In particular, it is thereby possible to use self-adhesive plastic material such as for example 2-component materials. As already described with reference to the expanding material, a first component of a self-adhesive plastic material can for example be arranged on the top side of the base panel, and a second component of a self-adhesive plastic material can be arranged on the bottom side of the cover panel. After the cover panel is applied, they react together to form the sound-insulating layer according to the invention.

It can also be possible to apply a particularly large amount by applying an elastic plastic material to both sides (i.e., on the top side of the base panel and the bottom side of the cover panel). This is also possible according to the first alternative of the invention by means of a plurality of plys of foam that jointly form a sound-insulating layer, as well as by means of a plurality of plys of self-adhesive plastic material that also jointly form a sound-insulating layer. Especially thick sound-insulating layers can thereby be generated in an advantageous manner.

According to one development of the invention, at least one or a plurality of spacers is arranged, at least in sections, to produce the sound-insulating layer between the base panel and the cover panel in a level with the sound-insulating layer.

The spacers that in particular are used with the second alternative of the invention are designed to guarantee an even distance between the base panel and cover panel. They can prevent the cover panel from sinking into the sound-insulating layer, for example while being applied. This can prevent a sound-insulating layer of uneven thickness from arising.

The spacers are designed to resist the pressure of the cover panel lying thereupon and possibly also the pressure when the sandwich is pressed; if applicable, they can withstand high pressures. In addition, they can be designed to prevent the cover panel from rising from the expanding material when an expanding material is used as a sound-insulating layer. In this case, one end of the spacers is fastened to one of the two panels, and they are designed to absorb the traction exerted on them.

The spacers can simultaneously be arranged above the base panel before or after the sound-insulating layer is applied. They can for example be placed in the elastic plastic material. It is also possible to arrange the sound-insulating layer of elastic plastic material around the spacers on the base panel. It is also for example possible to arrange the spacers on the either and/or the other of the base panel and cover panel, and arrange the self-adhesive plastic material on the either and/or the other of the base panel and cover panel.

The spacers can consist of any material. For example, it is possible for the spacers to consist of a plastic, rubber, wood-based material, paper or cardboard. The combination of the materials is also conceivable.

In order for example to prevent sound bridges from arising by means of the spacers between the base panel and cover panel, the spacers at least partially consist of hot melt adhesive according to one development of the invention.

The advantage of hot melt adhesive is that it has a sufficient hardness and strength up to a specific temperature that ensure a reliable and even distance between the base panel and cover panel. Depending on the temperature that is used to press the sandwich in the press, it is possible for the hot melt adhesive to melt just slightly between the base panel and cover panel and possibly additionally bond the panels.

It is however particularly preferable to melt the hot melt adhesive, at least almost completely, for example during the pressing process. In this case, the hot melt adhesive runs, and there is no sound bridge between the cover panel and base panel. In particular when expanding material is used, the hot melt adhesive can be thereby displaced, and the freed space is filled in between the base panel and cover panel that the spacers of hot melt adhesive assumed between the base panel and cover panel. In a particularly advantageous manner, this prevents sound bridges from arising and ensures that between the base panel and cover panel an even distance arises which is completely filled by the sound-insulating layer.

According to a development of the invention, the method is characterized in that the sound-insulating layer arranged as a closed-cell foam according to the first alternative has a thickness between 0.1 mm to 5.0 mm, preferably 0.25 mm to 3.5 mm, particularly preferably between 0.5 mm to 2.5 mm, advantageously between 0.75 mm to 2 mm, and particularly advantageously between 0.5 mm to 1.0 mm, or that the sound-insulating layer applied and set as a self-adhesive plastic material according to the second alternative of the invention has a thickness between 0.3 mm to 5.0 mm, preferably 0.35 mm to 3.5 mm, particularly preferably between 0.5 mm to 1 mm, advantageously between 0.75 mm to 2 mm, and particularly advantageously between 0.3 mm to 0.5 mm.

The thickness of the sound-insulating layer has a decisive influence on the effect as a sound insulator. In principle, the thicker the sound-insulating layer, the better the insulation against the transmission of sound, impact sound or the reflection of room sound. According to the second alternative of the invention, a minimum thickness of 0.3 mm is required for the self-adhesive plastic material. The closed-cell foam according to the first alternative of the invention can be designed thinner than 0.3 mm without loosing its sound-insulating effect.

The preferred indicated thickness refers to the overall thickness of the sound-insulating layer. As described, and in regard to the first and second alternative of the invention, the sound-insulating layer can however be designed in multiple layers. That is, both the foam as well as the self-adhesive plastic material can be applied sequentially in a plurality of thin plys to form a sound-insulating layer. With the closed-cell foam, it is therefore possible to arrange an adhesive layer between the plurality of thin plys that adheres the individual foam plys to each other to form a closed-cell foam layer.

In one embodiment according to a second alternative of the invention, the different plys of self-adhesive plastic material can be applied wet-in-wet, or a layer of self-adhesive plastic material can be partially gelled/dried before another layer is applied. This can for example prevent the self-adhesive plastic material from running.

Even when the self-adhesive plastic material is applied in a solid or pasty form, it is possible to apply a plurality of plys sequentially or on top of each other and possibly treat the individual plys, for example partially harden, i.e., for example partially gel.

A panel sandwich with a plurality of sound-insulating layers is particularly preferable. These are arranged separately from each other in the panel sandwich by additional sound-insulating layers and/or non-sound-insulating layers. For example, above a first sound-insulating layer, a layer can be arranged that consists of fabric, paper or wood material above which a second sound-insulating layer is arranged that in turn neighbors a cover panel. When using a plurality of sound-insulating layers in a panel sandwich, e.g. layers consisting of self-adhesive plastic material and closed-cell foam can also be combined. It should also be noted that each sound-insulating layer can in turn consist of a plurality of layers.

A preferred embodiment of the invention relates to the further processing of the panel sandwich into a sound-insulating panel, especially for use as a wall, ceiling or floor panel. A panel sandwich produced according to claim 1 is provided with a surface coating, e.g. by means of a method comprising at least the steps:
  Providing the panel sandwich,
  applying the surface coating on the cover panel of the panel sandwich,
  hardening the surface coating, and
  producing an inseparable bond between the surface coating and the cover panel of the panel sandwich.

To be understood as providing the panel sandwich are all necessary, conventional and/or advantageous measures for preparing for the coating of the panel sandwich. These comprise in particular all measures that have already been cited above with regard to providing the base panel and/or cover panel.

When the surface coating hardens, an inseparable bond is created between the surface coating and the cover panel of the panel sandwich. In this context, inseparable means that the surface coating cannot be separated from the surface of the cover panel without destruction.

Given the structure of the panel sandwich according to the invention, it can be coated using all conventional surface coatings and all conventional methods for coating surfaces. It is therefore possible, for example, to apply solid or prefabricated surface coatings that are panel-shaped, strip-shaped, or in the form of a mat on to the cover panel, and press them on. Conventional pressing parameters such as temperatures of 160° C. to 230° C., pressures of 30 kg/cm$^2$ to 60 kg/cm$^2$ and pressing times of 8 sec to 30 sec can be used for the DPL coating without negatively influencing the sound-insulating layer, i.e., attenuating its effect. It is particularly preferable to coat the panel sandwich in a DPL (direct pressure laminate) method.

Liquid surface coatings can also be applied for example by rolling, spraying or squeegeeing, possibly also by painting and/or digital printing, onto the cover panel of the panel sandwich. Liquid coating means can also be processed using conventional methods, and in particular conventional drying methods (such as heat or radiation) without negatively influencing the sound-insulating layer.

In a particular embodiment of the panel sandwich, it is possible to use a cover panel with at least a partially finished or prepared surface coating when producing the panel sandwich. It is particularly preferable to surface-coat a cover panel in a PDL method (printed decor laminate) and then adhere the sound-insulating layer and base panel. Adhesion (pressing) can occur by means of the intrinsic weight of the panels, or for example by supplying heat, radiation or pressure. A combination consisting of for example heat and pressure, or radiation and pressure, can also be used to harden the adhesive layers and/or layers of the surface coating, and/or the sound-insulating layer.

The surface coating can consist of a plurality of layers. The layers in turn can consist of a plurality of plys. It is for example possible to integrate additional, sound-reducing layers, such as particularly soft layers consisting of paints or films with a low Shore hardness, into the surface structure. In addition, e.g. individual particularly wear-resistant layers or plys that for example are equipped with wear-resistant particles (especially corundum) can be integrated in the surface coating.

It is particularly preferable to apply at least one decorative layer and at least one wearing layer. However, a plurality of decorative layers and/or wearing layers can also be applied.

All known coatings can be used as the decorative layer such as decorative paper or films, paint or varnish layers. As already mentioned, the decorative layer can be formed from a plurality of individual plys of solids (such as decorative paper or film) or liquids or pastes (such as paint or varnish layers) that are applied sequentially and/or simultaneously at least in sections, and for example are at least partially gelled between the individual application of the plys and/or the individual application of the different layers. A wet-in-wet application of liquid or pasty layers or plys is also possible for the materials that need to harden before they are useful, such as radiation-curing paints or UV-curing varnishes.

The decorative layers can be designed single-color or multicolor. It is for example possible to use paint layers, layers of pigments or colored paints or artificial resins as the decorative layer. It is particularly preferable to apply the decorative layer in a PDL method to the panel sandwich.

The wearing layer of the surface coating can also be designed very differently like the decorative layer. Artificial resins that cure under pressure and temperature are conventional such as melamine resin, or phenol resin, or radiation-curing, or UV-curing varnishes. A plurality of wearing layers can also be applied. The wearing layers can consist of a plurality of plys like a decorative layers. These can be different plys and/or layers with the same or different functions and/or components. The layers and/or plys can if applicable be applied in different procedural steps and/or using different methods. It is preferable to integrate corundum-containing layers in the surface coating, or individual corundum-containing plys in the wearing layer in order to achieve particularly high abrasion resistance or scratch resistance.

It is particularly preferable to apply the at least one decorative layer and/or at least one wearing layer as a liquid. The application can be by means of spraying or rolling. It is also possible to squeegee on, paint on and/or print on (for example by means of digital printing) the decorative layer and/or wearing layer. In conjunction with the decorative layer and the wearing layer, "liquid application" is understood to be the application of pasty or highly viscous layers.

It is also possible to incorporate structures into the decorative layer and/or the wearing layer, or to integrate structure-forming plys or layers into the surface coating. It is in particular possible to emboss the surface coating after application, possibly before the subsequent hardening or after hardening, or integrate plys or layers into the surface coating that influence the even distribution of individual layers and/or plys so that, for example, a pore structure arises in the surface coating patterned after wood.

According to one development of the invention, the decorative layer is applied as a printed decorative layer, especially a printed decorative paper or printed decorative film.

Backing papers, so-called overlays, that are for example saturated with artificial resin, especially saturated with melamine resin, can also be used as the wearing layer. It is also possible to apply a liquid overlay, i.e., an artificial resin with for example cellulose fibers, as the wearing layer onto the decorative layer.

Given the structure according to the invention, the finish-coated panel sandwich can be processed further in any conventional panel production method. In addition to the described coating methods, this includes in particular methods for applying profiles on the side edges.

It is particularly preferable for the sandwich consisting of at least the panel sandwich and the surface coating to be pressed in a press to harden and bond. In particular when decor backing and overlays are used, the hardening occurs in a press under the effect of pressure and heat. The normal pressing parameters for pressing surface coatings on wood-based material panels can be used. All conventional presses can be used; however, short cycle presses are preferably used.

Furthermore, the objective is achieved by a panel sandwich, as disclosed herein, as well as its use as a wall, ceiling, or floor panel as disclosed herein.

The panel sandwich according to the invention, e.g. for use as a support panel for panels, has a base panel consisting of a wood-based material, a sound-insulating layer and a cover panel that is suitable for being coated with a surface coating and is characterized in that an elastic plastic material is arranged as the sound-insulating layer, wherein according to a first alternative, the elastic plastic material consists of a closed-cell foam, or according to a second alternative of the invention, the elastic plastic material consists of a self-adhesive plastic material that is elastic in a set state, wherein the set sound-insulating layer has a minimum thickness of 0.3 mm.

Given the special structural design of the panel sandwich according to the invention already described in the production method, it can absorb impact sound as well as room sound. The structural design of the panel sandwich advantageously prevents the conduction of sound energy within the sandwich. The sound energy that for example exists in the cover panel of the panel sandwich penetrates the cover panel into the sound-insulating layer according to the first or second alternative of the invention. The sound energy propagates particularly well therein and it is not, or is only partially, transmitted into the base panel.

It is particularly preferable for the panel sandwich to have additional impact sound insulation that is arranged below the base panel, i.e. on the side of the base panel opposite the cover panel. In combination with the panel sandwich according to the invention and the sound-insulating layer present therein, there is nearly complete absorption of sound energy such that sound energy is not transferred to a room-neighboring surface (such as a ceiling, floor and/or wall).

In particular, the panel sandwich according to the invention therefore reduces the transmission of impact sound that arises when walking on a panel sandwich and is transmitted to the adjacent floor.

Sound energy is particularly well reflected by hard surfaces. In addition to the above-described reduction of impact sound, the panel sandwich according to the invention also reduces room sound, i.e., sound that arises from walking on the floor in a room and that is audible in the room. The panel sandwich according to the invention makes it possible to cushion the cover panel on the sound-insulating layer so that the reflection of sound energy back into the room is reduced. This also includes the attenuation of sound energy that causes the cover panel to vibrate.

It is particularly preferable to use the surface-coated panel sandwich as a panel. Panels are characterized in that on the one hand, they have at least a one-sided surface coating and on the other hand, profiling of the side edges to connect to other panels. Tongue and groove profiles can be used as the profiles. It is however preferable to use clicking, pivoting or pushbutton profiles that make it particularly easy to lay the panels to form a surface. When creating the profiles (for example by milling), the foam is also cut. The closed-cell foam, however, also advantageously prevents media from escaping from the foam/penetrating into the foam so that its sound-insulating effect is fully retained even after the profiles are milled.

In addition to the surface coating on the top side, the panels (as well as surface-coated panel sandwiches) can have an equivalent on the bottom side opposite the top side, for example consisting of a cellulose-based carrier material (such as backing paper) saturated with artificial resin.

In addition, both the surface-coated panel sandwiches as well as panels can possess additional functional layers for example on the front side or on the rear side. The aforementioned additional impact sound insulation on the bottom side that, for example, can be arranged as a soft and possibly elastic layer on the bottom side of the panel sandwich/panel is particularly advantageous. Impact sound insulation can for example to be bonded subsequently to the panel/panel sandwich, or bonded to the base panel during or before producing the panel sandwich. All conventional impact sound insulation can be used such as cork, plastic foams or especially light fiberboard consisting of natural and/or artificial fibers.

BRIEF DESCRIPTION OF THE DRAWINGS

In the following, exemplary embodiments of the invention will be further explained with reference to figures. In the figures:

FIG. 4 shows a schematic representation of a flow of a coating procedure for an embodiment of a panel sandwich according to the invention;

DETAILED DESCRIPTION

Figure 1:
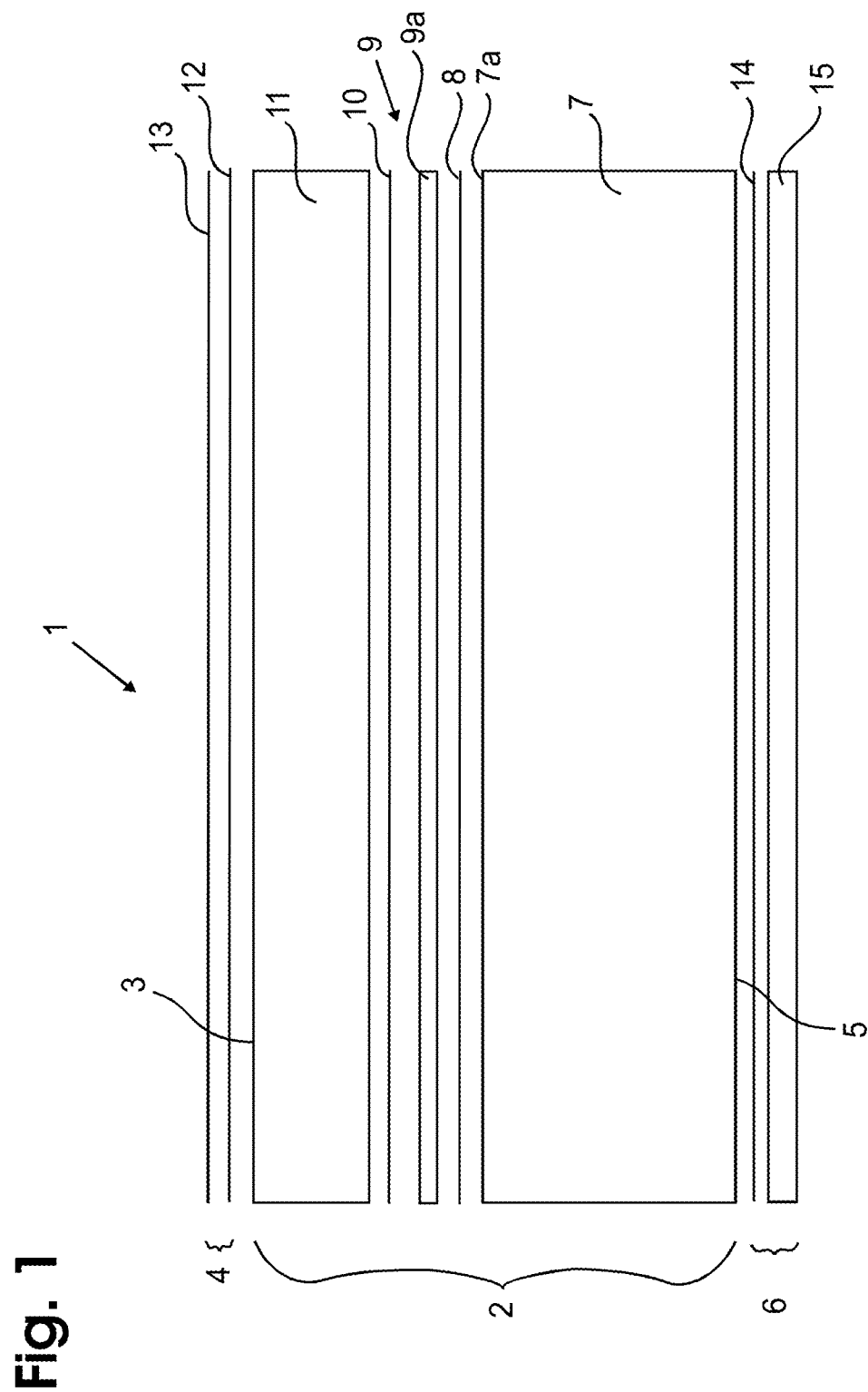
FIG. 1 shows a schematic exploded view of an embodiment of a panel sandwich according to the invention according to the first alternative of the invention.

FIG. 1 shows a panel with a panel sandwich 2 according to the invention according to the first alternative of the invention. The panel 1 has a surface coating 4 arranged on the top side 3 of the panel sandwich 2, and a bottom coating 6 arranged on the bottom side 5 of the panel sandwich 2.

The panel sandwich 2 shown in FIG. 1 consists of a base panel 7 that is designed as a support panel for panel 1. The base panel 7 consists of a light MDF panel with a gross weight of approximately 650 kg/m$^3$. The base panel 7 has local reinforcements (not shown) in the region where the profiled edges will be subsequently arranged (not shown). Alternately to a light MDF panel, an MDF panel, an HDF panel or a plywood panel can be used.

A first adhesive layer 8 is arranged on a top side 7a of the base panel 7. This first adhesive layer 8 consists of a 2-component polyurethane adhesive that is applied liquid. The first adhesive layer 8 was sprayed on thinly and evenly with a spray device (see FIG. 3) in a layer 0.08 mm thick over the entire surface of the base panel 7.

A sound-insulating layer 9 is arranged above the first base panel 7 with the adhesive layer 8. The sound-insulating layer 9 consists of a closed-cell foam 9a, in this case a polyolefin foam, with a thickness of approximately 0.7 mm.

Above the sound-insulating layer 9, i.e. on the surface of the sound-insulating layer 9 that is facing a cover panel 11, a second adhesive layer 10 is arranged which, like the first adhesive layer 8, consists of a 2-component polyurethane adhesive and is applied liquid by means of a spray device (see FIG. 3) on the sound-insulating layer 9.

The polyolefin foam is corona-treated on both sides in order to achieve a particularly good adhesion of the adhesive layers 8, 10 on the polyolefin foam. Delamination between the polyolefin foam and base panel 7, or polyolefin foam and cover panel 11, is thereby avoided over the long term in a particularly advantageous manner.

The cover panel 11 is also depicted that is placed on the second adhesive layer 10 and therefore above the sound-insulating layer 9. The cover panel consists of an HDF panel and has a bulk density of approximately 850 kg/m$^3$.

The panel sandwich 2 shown in FIG. 1, including the adhesive layers 8, 10, has an overall thickness of approximately 9.6 mm. The cover panel 11 is approximately 2.5 mm thick, the base panel 7 is approximately 6.4 mm thick, and the sound-insulating layer 9 is approximately 0.7 mm thick as mentioned. The surface coating 4 shown in FIG. 1 consists of a decorative layer 12, in this case a decorative paper saturated with melamine resin, and a wearing layer 13, in this case overlay paper, arranged above the decorative layer 12. The overlay paper is saturated with melamine resin like the decorative paper.

The bottom coating 6 of the depicted panel sandwich 2 consists of an equivalent 14, in this case backing paper saturated with melamine resin, and an impact sound insulation 15, in this case closed-cell foam having a thickness of 2 mm. The impact sound insulation 15 is adhered to the equivalent.

In comparison to a panel without a sound-insulating layer 9 but with a 3 mm thick PE impact sound insulation (comparative panel), the panel shown in figure improves the sound in the room by approximately 44% measured according to IHD W431/DIN45631.

Figure 2:
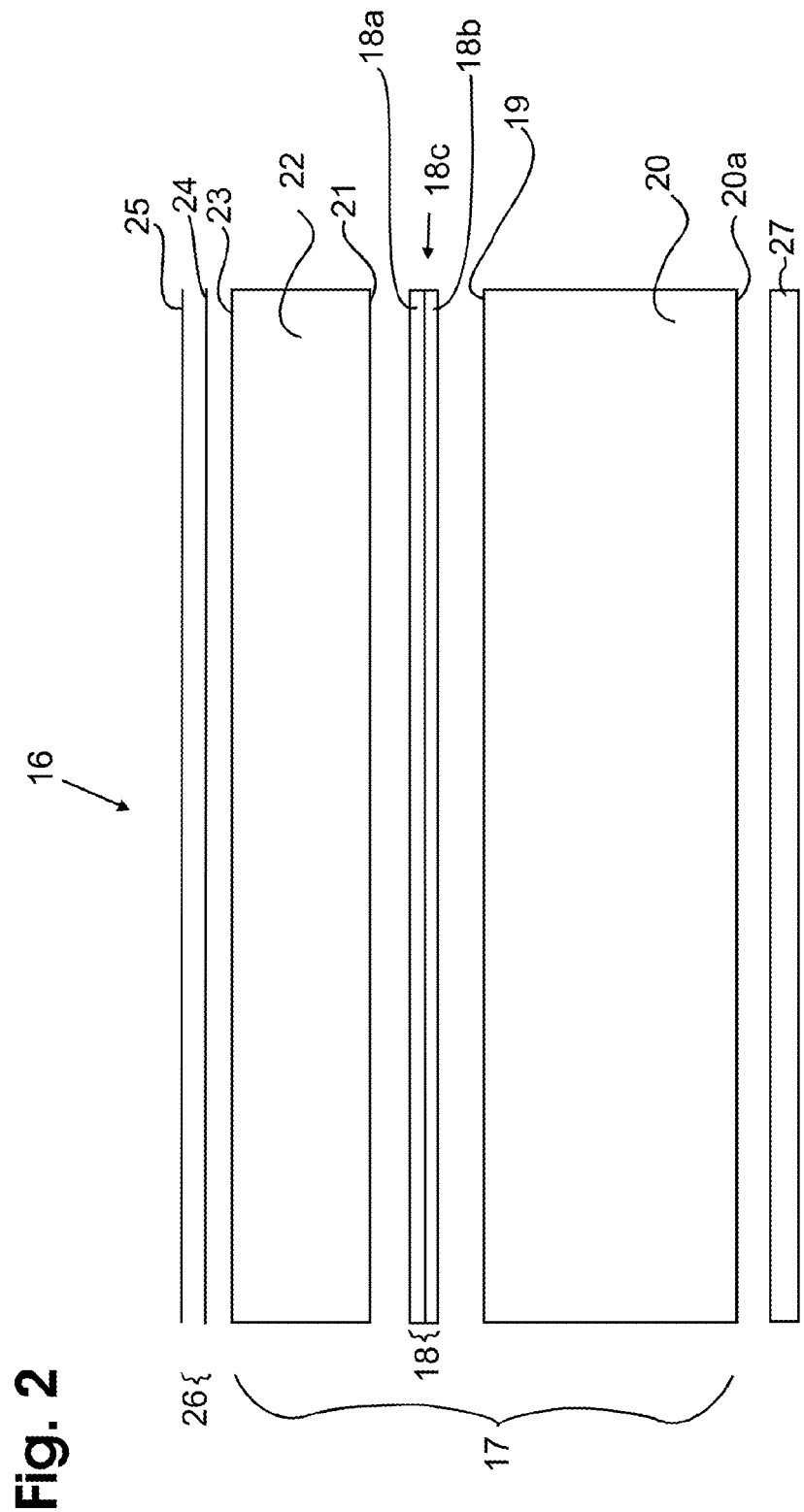
FIG. 2 shows a schematic exploded view of an embodiment of a panel sandwich according to the second alternative of the invention.

FIG. 2 shows a panel 16 with a panel sandwich 17 according to the invention according to the second alternative of the invention. A self-adhesive plastic material 18c is arranged between a top side 19 of a base panel 20 and a bottom side 21 of a cover panel 22 as the sound-insulating layer 18. The base panel 20 consists of a wood-based material, in this case an MDF panel, with a gross weight of approximately 780 kg/m$^3$ and a thickness of approximately 12 mm. The cover panel 22 consists of an HDF panel with a gross weight of approximately 850 kg/m$^3$ and a thickness of approximately 4 mm.

The sound-insulating layer 18 was sprayed on in two plys. The first ply 18a was sprayed on as a liquid self-adhesive plastic material 18c on to the top side 19 of the base panel 20. The second ply 18b was generated by spraying the same self-adhesive plastics material 18c onto the bottom side of the support panel 22. Both plys 18a, 18b have a thickness of approximately 1.6 mm. Both plys 18a, 18b together form the sound-insulating layer 18 that thereby has a thickness of approximately 3.2 mm. Both plys 18a, 18b of the self-adhesive plastic material 18c are adjusted to be highly viscous when sprayed on in order to prevent running after being sprayed. The two plys 18a, 18b can alternately both one on top of the other be sprayed on to the top side 19 or the bottom side 21.

In addition to the sound-insulating function, the sound-insulating layer 18 adheres the base panel 20 to the cover panel 22. The sound-active layer 18 consists of a thermoplastic reactive PU material. Alternately, e.g. a reactive hot melt adhesive could be used that hardens and permanently cross-links when cooled.

On its top side 23, the cover panel 22 has a surface coating 26 consisting of a decorative layer 24 and a wearing layer 25 arranged on the decorative layer 24. The decorative layer 24 consists of a multi-ply paint/varnish coating that constitutes a wood decor. Alternately, e.g. a single-color decor, tile decor or any picture can be represented by the decor. The decorative layer 24 was applied liquid by means of rolling. The decorative layer 24 can alternately be e.g. sprayed on.

The wearing layer 25 consists of a particularly wear-resistant surface varnish applied in multiple plys which is transparent and contains hard particles (not shown) to increase abrasion resistance and scratch resistance. It is alternatively possible to e.g. arrange an artificial resin coating as a liquid or solid overlay.

Impact sound insulation 27 is adhered to the bottom side 20*a* of the panel sandwich 17 opposite the surface coating 26. The impact sound insulation 27 consists of an open-cell polyurethane foam. Alternately e.g. a wood fiber panel, cork or a closed-cell polyolefin foam could be used.

The second embodiment of the invention depicted here offers insulating behavior for sound that is comparable with that of the panel sandwich according to FIG. 1.

Figure 3:
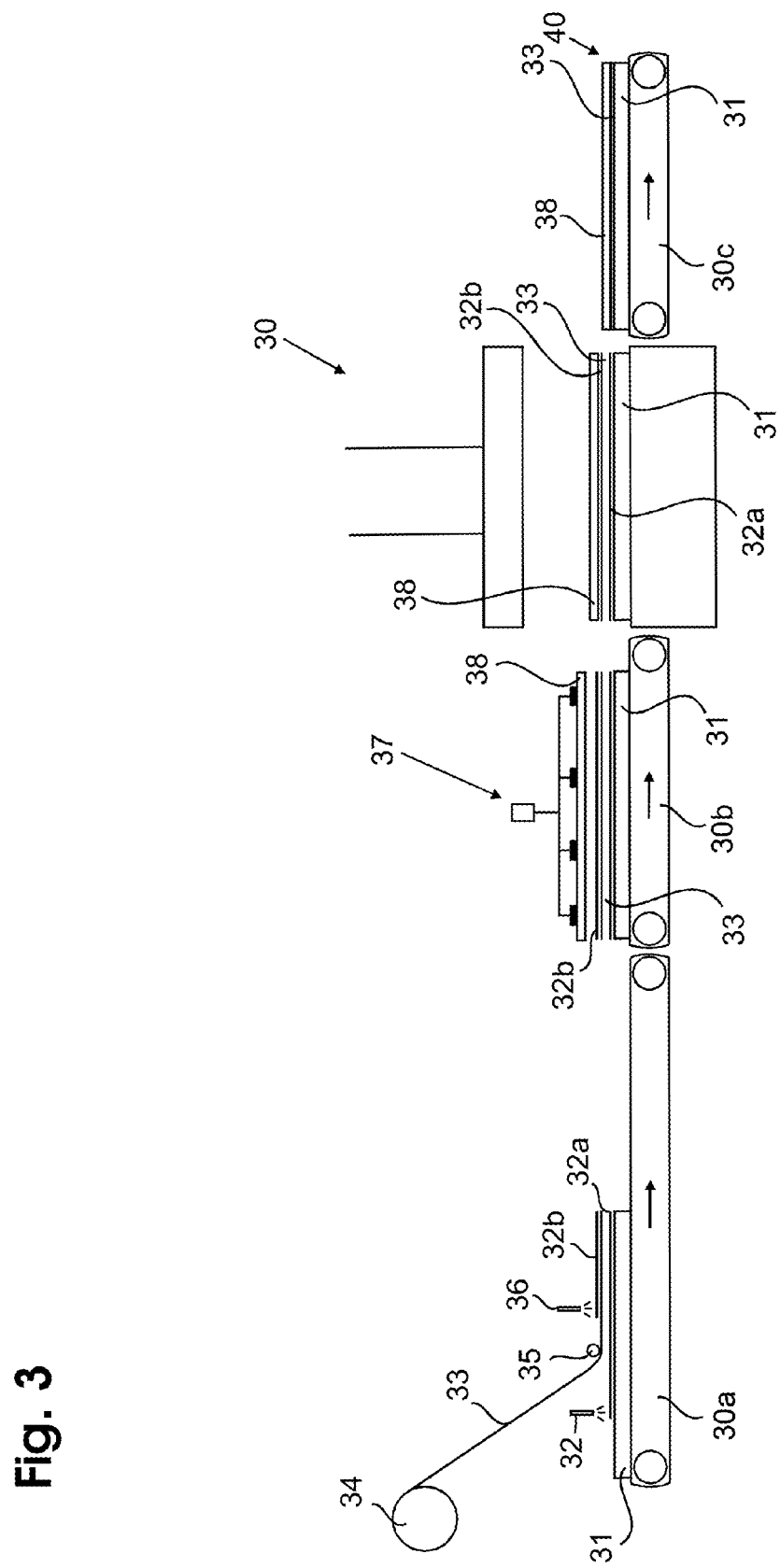
FIG. 3 shows a schematic representation of a flow of a manufacturing procedure for an embodiment of a panel sandwich according to the invention.

FIG. 3 schematically portrays the flow of a production procedure for a panel sandwich according to the first alternative of the invention. A multi-part press supply and removal device 30*a*, 30*b*, 30*c* and a short cycle press 30 is shown.

In the production procedure, a first MDF panel that functions as the base panel 31 is sprayed by a first spraying device 32 on the top side with a first adhesive layer 32*a* consisting of PVAC adhesive. A closed-cell polyolefin foam 33 is arranged on the adhesive layer 32*a*. The closed-cell polyolefin foam 33 is 3.5 mm thick and is affixed to the first adhesive layer 32*a* by means of an unrolling device 34 and a first press roller 35. By means of a second spraying device 36, the surface of the polyolefin foam 33 opposite the base panel 31 is sprayed with a second adhesive layer 32*b* consisting of a PVAC adhesive. Both surfaces of the polyolefin foam are corona-treated.

Subsequently in the panel sandwich production procedure, a cover panel 38 is applied on the second adhesive layer 32*b* by means of a vacuum lifting device 37. The cover panel 38 consists of a 5 mm thick HDF panel. The depicted cover panel 38 does not have a surface coating. Alternately, it is e.g. possible to use an already surface-coated cover panel 38 that in particular has been painted in a PDL process.

The panel sandwich that has been prepared in this manner is fed into the short cycle press 30 by means of the feed device 30*a*, 30*b*. In the short cycle press 30, the prepared panel sandwich is supplied with heat, pressure is exerted on the sandwich by means of the upper press ram, and the sandwich is pressed. When an already surface-coated cover panel is used, the pressing parameters of temperature, pressure and/or heat can be set particularly low so as not to damage the surface coating through the pressing process.

After pressing, the pressed panel sandwich 40 exits the short cycle press and can e.g. be further processed into a panel corresponding to the coating method depicted in FIG. 4.

FIG. 4 schematically portrays a flow of a coating method for a panel. The finished panel sandwich 40 from FIG. 3 is surface-coated in a coating device 41. The surface coating consists of a decorative paper 42 and an overlay 43 that are sequentially placed on the panel sandwich 40. The decorative paper 42 consists of a printed paper backing, the overlay 43 consists of an overlay paper. Both papers are saturated with an artificial resin.

After applying the surface coating, the panel sandwich 40 with the applied decorative paper 42 and the overlay 43 arranged above the decorative paper 42 is transferred to a short cycle press 44. The surface coating with the panel sandwich 40 is pressed in the short cycle press 44. The closed-cell foam according to the invention as well as possibly the self-adhesive plastic material according to the invention allow a short cycle pressing process with a conventional pressure and pressing time as is used for overlay paper and decorative paper. After pressing, the pressed panel is removed from the short cycle press and can be processed in accordance with its subsequent use, in particular cut and shaped.

The procedural steps depicted in FIG. 3 and FIG. 4 can be arranged separate from each other or in a direct sequence. After applying the cover panel 38 with the vacuum lifting device 37 (see FIG. 3), it is also possible to directly create a surface coating without pressing, for example as shown in FIG. 4, for example by painting. The base panel with the sound-insulating layer and the cover panel are pressed together in a press 44, in this case while pressing the surface coating (see FIG. 4).

The invention claimed is:

1. A method for producing a panel sandwich (2, 17, 40) for use as a wall, ceiling or floor panel (1, 16) comprising at least the following steps:
   providing a base panel (7, 20, 31) made of wood-based material,
   arranging a sound-insulating layer (9, 18) above the base panel (7, 20, 31),
   arranging a cover panel (11, 22, 38) above the base panel (7, 20, 31), and
   pressing the sandwich, wherein the sound-insulating layer (9, 18) comprises an elastic plastic material which is a closed-cell foam (9*a*),
   wherein the plastic material before being introduced into the sandwich panel has an elasticity modulus under pressure of 0.25 MPa to 1.5 MPa, and
   wherein spacers comprising a hot melt adhesive are arranged before the pressing step in sections in a level with the sound-insulating layer (9, 18) between the base panel (7, 20, 31) and the cover panel (11, 22, 38) such that the sound-insulating layer surrounds the spacers and
   wherein the hot melt adhesive is melted during the pressing step to partially remove the spacers and thereby avoid forming a sound bridge in the panel sandwich between the base panel and the cover panel.

2. The method according to claim 1, wherein the closed-cell foam (9*a*) is applied in the form of a strip.

3. The method according to claim 1, wherein an adhesive layer (8, 10, 32*a*, 32*b*) is arranged above and/or below the closed-cell foam (9*a*) wherein the adhesive layer is selected from the group consisting of 1-component polyurethane adhesive, 2-component polyurethane adhesive, a PVAC adhesive, a hot melt adhesive, a reactive hot melt adhesive and an ethylene acetate copolymer.

4. The method according to claim 1, wherein the closed-cell foam (9*a*) of the sound insulating layer (9) consists of a physically cross-linked polyolefin or a mixture of polyolefins.

5. The method according to claim 1, wherein the closed-cell foam (9*a*) used to produce the sound-insulating layer (9) is corona-treated.

6. The method according to claim 1, wherein the sound-insulating layer (9, 18) is applied on a top side (7a, 19) of the base panel (7, 20, 31) and/or a bottom side (21) of the cover panel (11, 22, 38).

7. The method according to claim 1, wherein the spacers consist at least partially of hot melt adhesive.

8. The method according to claim 1, wherein:
the closed-cell foam (9a) has a thickness between 0.1 mm to 5.0 mm.

9. The method according to claim 1, comprising at least the steps:
providing the panel sandwich (2, 17, 40),
applying a surface coating (4, 26) on the cover panel (11, 22, 38) of the panel sandwich (2, 17, 40),
hardening the surface coating (4, 26) and
producing an inseparable bond between the surface coating (4, 26) and the cover panel (11, 22, 38) of the panel sandwich (2, 17, 40).

10. The method according to claim 1, wherein
the closed-cell foam (9a) has a thickness between 0.25 mm to 3.5 mm.

11. The method according to claim 1, wherein
the closed-cell foam (9a) has a thickness between 0.5 mm to 2.5 mm.

12. The method according to claim 1, wherein
the closed-cell foam (9a) has a thickness between 0.75 mm to 2 mm.

13. The method according to claim 1, wherein
the closed-cell foam (9a) has a thickness between 0.5 mm to 1.0 mm.

* * * * *